(12) United States Patent
Ofner

(10) Patent No.: US 7,286,287 B1
(45) Date of Patent: Oct. 23, 2007

(54) VISUAL AID IN THE FORM OF TELESCOPIC SPECTACLES WITH AN AUTOMATED FOCUSING DEVICE

(75) Inventor: Anton Gerald Ofner, Vienna (AT)

(73) Assignee: Life Optics GmbH, Vienna (AT)

( * ) Notice: Subject to any disclaimer, the term of this patent is extended or adjusted under 35 U.S.C. 154(b) by 0 days.

(21) Appl. No.: 09/889,895

(22) PCT Filed: Nov. 23, 2000

(86) PCT No.: PCT/AT00/00317

§ 371 (c)(1),
(2), (4) Date: Jul. 24, 2001

(87) PCT Pub. No.: WO01/38919

PCT Pub. Date: May 31, 2001

(30) Foreign Application Priority Data

Nov. 24, 1999 (AT) .................................... 1994/99
Nov. 30, 1999 (AT) .................................... 2016/99

(51) Int. Cl.
*G02B 23/00* (2006.01)
(52) U.S. Cl. ..................... 359/418; 359/404; 359/422
(58) Field of Classification Search ................ 359/399, 359/407, 409–411, 422, 480–481; 250/201.6
See application file for complete search history.

(56) References Cited

U.S. PATENT DOCUMENTS

| 2,406,526 A | | 8/1946 | Bennett et al. | |
|---|---|---|---|---|
| 4,673,260 A | | 6/1987 | Steinberg | |
| 4,779,965 A | | 10/1988 | Beecher | |
| 4,886,340 A | * | 12/1989 | Kanda | ......................... 359/411 |
| 5,078,469 A | | 1/1992 | Clark et al. | ................... 359/481 |
| 5,374,820 A | | 12/1994 | Haaksman | ............... 250/201.6 |
| 5,486,948 A | | 1/1996 | Imai et al. | ................... 359/462 |
| 5,592,331 A | * | 1/1997 | Eastcott | ...................... 359/554 |
| 5,671,087 A | * | 9/1997 | Kawamura | ................... 359/410 |
| 5,959,769 A | * | 9/1999 | Yoneyama | ................... 359/407 |
| 5,971,540 A | | 10/1999 | Ofner | ......................... 351/200 |

(Continued)

FOREIGN PATENT DOCUMENTS

AT          E 98 782 B      9/1994

(Continued)

*Primary Examiner*—Mark A. Robinson
*Assistant Examiner*—Lee Fineman
(74) *Attorney, Agent, or Firm*—Young & Thompson

(57) ABSTRACT

A vision aid in the form of telescopic spectacles has two lens systems, which each comprise at least one objective lens (70) and one eyepiece (71). An autofocussing element which changes the focal length of the lens systems for sharp focussing thereof according to the distance of the telescopic spectacle from the object is assigned to the lens systems. Furthermore, an element for changing the magnification factor by changing the focal length of the lens systems ("zoom") and finally an element for matching the parallax between the lens systems of the vision aid to the focal length which has been set according to the distance of the telescopic spectacles from the object are assigned to the lens systems. The parallax is adapted using adjustable optical elements (11) which are located in the beam path of the lens systems, with which elements the angle (13) between the beam paths (14) running from the lens systems (1) to the object can be changed.

60 Claims, 12 Drawing Sheets

U.S. PATENT DOCUMENTS 6,134,048 A * 10/2000 Kato et al. ................ 359/407
6,204,966 B1 * 3/2001 Steinhuber ................ 359/407

FOREIGN PATENT DOCUMENTS

| | | |
|---|---|---|
| AT | 000 307 U1 | 7/1995 |
| JP | 07152096 | 6/1995 |
| WO | 95/25979 | 9/1995 |
| WO | 96/09566 | 3/1996 |
| WO | 98/19204 | 5/1998 |

* cited by examiner

VISUAL AID IN THE FORM OF TELESCOPIC SPECTACLES WITH AN AUTOMATED FOCUSING DEVICE

BACKGROUND OF THE INVENTION

The invention relates to a vision aid with an autofocussing means, with a means for changing the focal length and with a means for matching the parallax between the tubes of the vision aid to the respectively set focal length.

One such vision aid (telescopic spectacles) with an autofocussing means, with a means for changing the focal length and with a means for matching the parallax between the tubes of the vision aid to the respectively set focal length, is disclosed in WO 96/09566 A (or the essentially identical U.S. Pat. No. 5,971,540 A). The known vision aid is intended for use as telescopic spectacles.

The known telescopic spectacles have an automatic and/or manual focussing means, a device for manually changing the magnification factor, and a device for automatic, mechanical parallax compensation corresponding to the respective focal length. If for example during vascular surgery, as a result of the location of the various surgical sites, a change of the working distance is necessary, the focal length and the parallax angle are automatically or manually adapted to the new working distance. This ensures optimum adjustment of the vision aid corresponding to the surgery. In addition, the user of the vision aid can assume the ergonomic position which is most advantageous at the time so that it is possible to operate without fatigue. In addition, the known vision aid makes it possible to adapt the magnification factor at each chosen working distance to the respective requirement. The known vision aid which is worn using a headset allows the user to largely freely choose the working distance and the magnification factor used. The control device is a foot-operated switch. In order not to lose the 3-D image when the working distance and the sharpness setting change, the known vision aid uses an autofocussing means which, by mechanically changing the angle of the tubes of the vision aid to one another, matches the parallax angle to the respective focal length. This type of matching of the parallax to the focal length which has been set at the time entails many defects.

(1) The tubes are mechanically adjusted by motors via gearing; this means a relatively great weight and thus little wearing comfort for the user.

(2) Since the tubes of the vision aid must be made movable to one another according to the lengthwise axis, the resistivity of the system to mechanical stress suffers.

(3) Each time the working distance changes, the parallax compensation means changes the position of the tubes to one another and thus also the angle of the eyepiece planes to the eyes of the user. This can lead to disruptive reflections and to a reduction in the size of the entry pupil and thus of the visual field.

(4) In practice it is hardly possible to produce systems which are independent of the user with this type of parallax compensation, i.e. each system is tailored to a certain user and his distal pupil distance. This necessitates higher investments if for example hospitals want to ensure than all surgeries can be carried out with autofocussing telescopic spectacles.

(5) If correction glasses which project over the eyepieces are attached to the latter, these glasses can touch the face of the user under certain circumstances when the position of the tubes change and thus distract him.

Furthermore, it would often be of great benefit to the user, for example in surgery, to be able to look at additional information such as the vital signs of the patients from the monitoring system, measurement scales or also x-ray, computerized tomography or other data during use of one such vision aid. The currently known telescopic spectacles do not offer this possibility.

Similar telescopic spectacles are known from AT E 98782 B.

U.S. Pat. No. 5,078,469 A discloses telescopic spectacles to which a video camera and a display unit are connected in order to take pictures of the surgical field.

WO 95/25979 A discloses a surgical microscope which has means for producing and displaying the three-dimensional video data of the surgical field and for reflecting in additional information, such as patient data.

U.S. Pat. No. 4,621,283 A describes a device to be worn on the head of a surgeon with telescopic spectacles and a photographic camera and a light source, the camera and the light source, regardless of the circumstance that they are worn on the top of the head at a distance, having a viewing direction which is essentially parallel to the viewing directions through the telescopic spectacles in front of the eyes of the surgeon, so that the image field viewed by the surgeon can be transmitted essentially from the same viewing angle via the recording means to a display screen.

SUMMARY OF THE INVENTION

The object of the invention is to make available a vision aid which is worn on the head and which allows the user to change the working distance and to use different magnification factors which are matched to the respective activity. Furthermore, the 3-D image will be preserved without the position of the two tubes of the vision aid to one another having to be altered, as is the case in the vision aid known from WO 96/09566. In addition, the user is to be enabled to look at additional information in text or image form originating from external data sources and to eliminate possible defective vision by the corresponding settings on the eyepieces of the vision aid.

Furthermore, the 3-D image will be preserved without the position of the two tubes of the vision aid to one another having to be altered, as is the case in the vision aid known from WO 96/09566. In addition, the user is to be enabled to look at additional information in text or image form originating from external data sources and to eliminate possible defective vision by the corresponding settings on the eyepieces of the vision aid.

This object is achieved as claimed in the invention with a vision aid which is characterized in that using the adjustable optical elements which are provided in the beam path of the vision aid the angle between the beam paths running from the tubes to the object can be changed.

The vision aid as claimed in the invention represents a completely new application or (product) class. On the one hand, it differs from telescopic spectacles or surgical microscopes mainly in that complete, free mobility during use which had been unknown in the past is possible by the features autofocus, optical parallax compensation and variable zoom. The vision aid as claimed in the invention differs from surgical microscopes mainly in that it can be worn on the head of the user by means of a headset.

The vision aid as claimed in the invention can be used not only in surgery on the human body or on animals, but wherever the user wants to see a working field magnified.

The invention makes available a light, stable and comfortable stereoscopic vision aid with a variable magnification factor, autofocus and automatic parallax compensation and with the possibility of compensation for defective vision, the angle of the tubes of the vision aid to one another not needing to be changed. This feature also allows a form of construction of the vision aid such that the two beam paths can be housed in a single, preferably oval tube. Furthermore, additional visual information can be offered to the user.

In the preferred embodiment the vision aid as claimed in the invention offers at least one of the aforementioned possibilities.

When the vision aid as claimed in the invention is being used in surgery, the working distance of the surgeon using the vision aid of the invention can be changed—for example to enable an assistant to look better into the surgical field without the magnification factor changing.

Furthermore, the size of objects, for example a tumor, can be subjected to more accurate determination without the need to adapt the magnification factor.

During an operation, brief crossing of the beam path between the objective lens and the surgical field often occurs; in the known telescopic spectacles this leads to unwanted adaptation of the focal length to the crossing object with a subsequent readaptation to the original viewing field by the autofocussing means. This can be avoided in the invention by the automatic change of the focal length being provided with a delay switch and therefore a change of the working distance leading to a focal length optimized to the new working distance only after an adjustable time and/or with a selectable speed. The reaction time of the autofocus part can therefore be matched to a certain situation or a personal working style.

Especially in the surgical version one embodiment of the invention allows students observing the surgery to follow the procedure in exactly that perspective which is also offered to the surgeon.

Especially in surgery in body cavities does the problem of optimum illumination often arise: the ceiling light often can hardly be moved into the proper position, a light source attached to a headset necessarily has a parallax angle to the optimum beam path between the objective lens and the viewing field; this leads to unwanted formation of cast shadows in body cavities with a small diameter. For assisting physicians it can also be advantageous to recognize the exact viewing field of the surgeon in order to direct their attention thereto.

Applications of the invention are also conceivable in which the autofluorescence properties of tissues are used. For this purpose a UV/IR or laser light source combined with the vision aid as claimed in the invention can be used, with or without different filter and frequency changing systems.

There are also application situations in which an intensified 3-D impression would be advantageous. This is done by the invention in one embodiment by a device for increasing the distance of the objective lenses from one another.

Often the user of the vision aid as claimed in the invention, for example to orient himself during an operation in the manner of a general survey, looks past the telescopic spectacles which are mounted in front of his eyes. When there is defective vision this is only practicable when correction glasses are attached to the eyepieces of the telescopic spectacles. These correction glasses, in order to avoid reducing the optical quality when the parallax angle changes, execute parallax adaptation at the same time in one embodiment of the invention when the focal length of the telescopic spectacles changes.

Defective vision which cannot be corrected by diopter compensation mounted on the eyepieces is a problem when using the vision aid known from WO 96/09566 and is eliminated in one embodiment of this invention by correction glasses which are attached to the eyepieces.

Also absorbing, reflecting or filtering protective glasses which are easy to clean and which are preferably provided as claimed in the invention as well as reflections of information, for example surgical parameters, into or next to the immediate visual field are advantageous in several conceivable applications.

For accurate quantitative determination of objects, a measurement scale which is made as a liquid crystal display, LED, vacuum fluorescence or gas discharge display or also in another form can be introduced in an intermediate image plane in the invention.

Furthermore, in one embodiment, by reflecting part of the beam path out onto a CAD camera module, a possibility arises which is desirable in the surgical version for example for observing the course of the surgery via a monitor.

A light source which is preferably provided, which is integrated into the optical system or which is made as a variable-aperture fiber bundle when using this embodiment of the vision aid of the invention compared to known vision aids is important. Light is coupled preferably by a beam splitter or into the prism surface of the prism reversal system. The light source can emit UV/IR or laser light for observation. The light reflected by the object can be absorbed or reflected by a filter in the eyepieces. The use of infrared light, ultraviolet light or laser light can be of great diagnostic value.

Parallax compensation when the focal length changes without changing the tube or eyepiece distances can be done in the invention by for example an electric motor mounted in the middle part of the vision aid simultaneously moving laterally and/or axially and optionally tilting the respective objective lens or a part thereof (front element), cam-controlled, via the corresponding sheathed cables or gearing. By using axial displacement, focussing (change in the focal length) to different distances can take place. In the base setting of the vision aid (the optical axis of the movable objective lens or part of the objective lens is in the optical axis of the vario extension) the distance setting and the convergence angle are preferably adjusted to a medium working distance so that the optical axes of the eyepieces run through the optical center points of the eyes. When the working distance changes, the objective lenses or for inner focussing the corresponding parts of the objective lens can be displaced axially so far that the object-side system focal points are in the object plane. At the same time, in the invention lateral motion controlled via cams can take place, of the type that the focal points of the two objective lenses are guided exactly along the plane of symmetry of the vision aid. For parallax compensation then neither an angle change nor a distance change with respect to the optical axes of the eyepieces is necessary.

Furthermore, at the same time, by tilting the objective lenses or parts thereof, correction of the image errors which occur due to their lateral offset (for example, astigmatism, tilting of the image plane) can be caused. The aforementioned motions of the objective lenses or parts of the objective lenses can also be accomplished by electrical or pneumatically operated linear drives of actuators.

The relationships between
a) sharp focussing of the lens systems by changing the focal length and
b) changing the magnification factor of the lens systems can be explained as follows:

In order to obtain a sharp picture at a given distance between a lens system and an article/object field, the focal length of the lens system must be changed according to the distance between the article/object field, for example with an autofocussing means. This "sharp focussing" yields a sharply focussed image with a size which is dependent solely on the distance between the lens system and the article/object field. The size of the sharply focussed image of the article/object field can only be changed by the distance between the article/object field and the lens system being changed (greater distance: smaller picture—smaller distance: larger picture). Changing the focal length of a lens system with a zoom means on the other hand yields a magnification or reduction of the image of the article/object field without the distance between the lens system and the article/object field being changed, therefore only by changing the focal length using the zoom means. Therefore both "sharp focussing" of a lens system with an autofocussing means and also adjustment of a zoom means imply a change of the focal length. Regardless of this, an autofocussing means and a zoom means are not one and the same.

This principle can be stated as follows on objective lenses of cameras: an autofocus camera without the zoom function can represent a certain tree, sharply focussed, as larger or smaller, but only when the camera is first nearer, then again farther away from the tree. In both cases it records the images with different focal length. A camera with a zoom objective lens on the other hand can record the tree from one location, one time larger, then again smaller—it also does this with different focal lengths, but it also has a zoom means. Since a zoom means requires an addition group of lenses with an adjustment mechanism in the lens system, the much higher price, the different (lower) light intensity and usually larger dimensions of these lens systems are obvious.

Other details, features and advantages of the invention follow from the following description of preferred embodiments of a vision aid (telescopic spectacles) of the invention using the schematic drawings.

Figure 7:
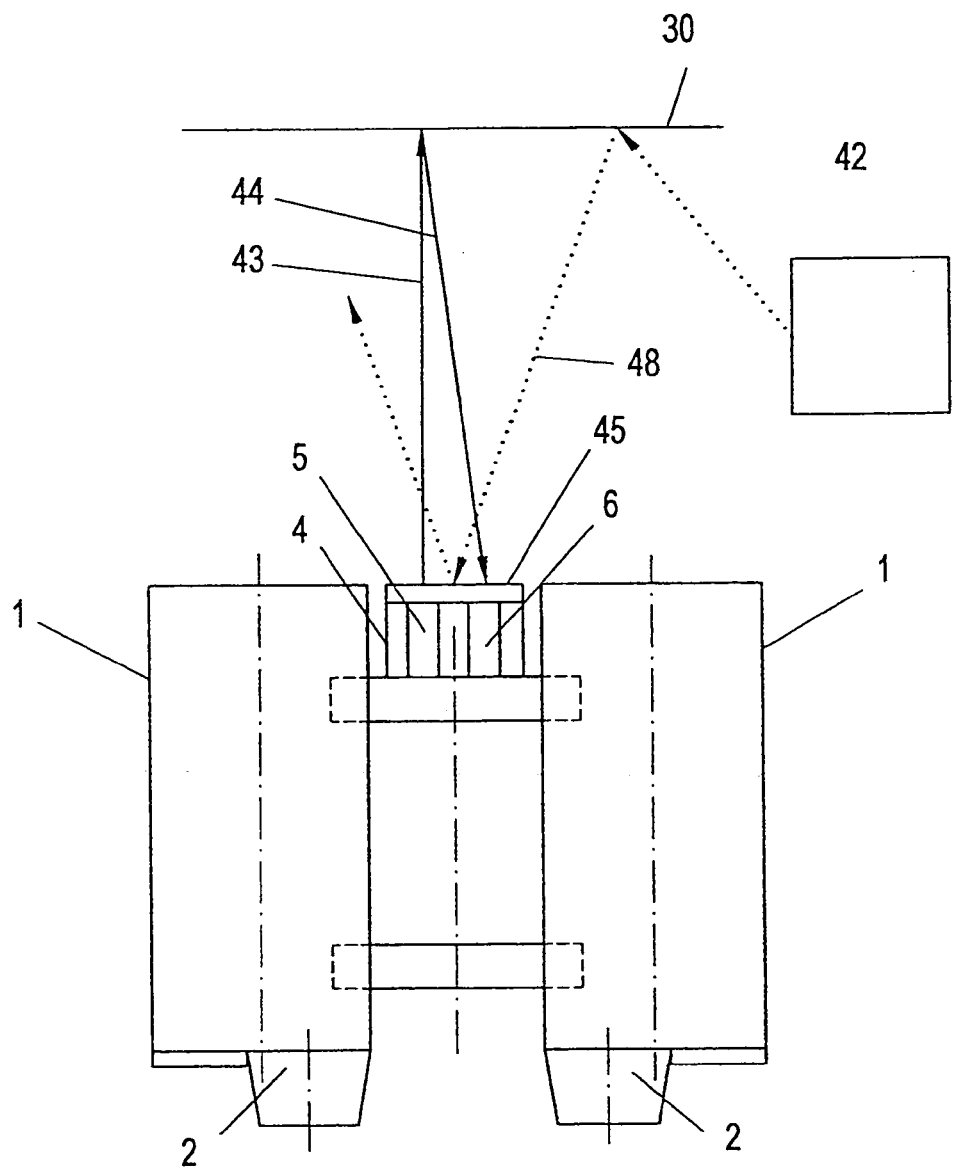
Figure 7A:
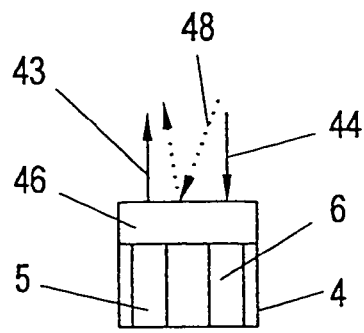
Figure 7B:
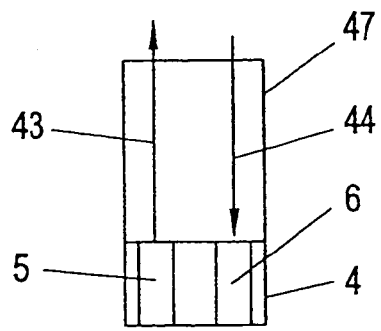
Figure 8:
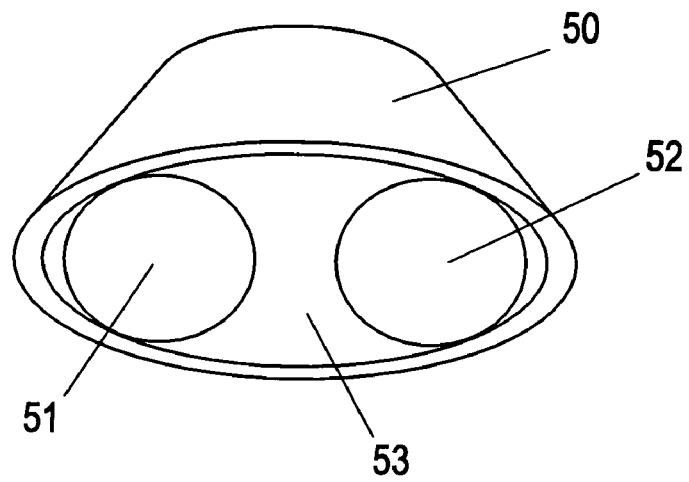
Figure 9:
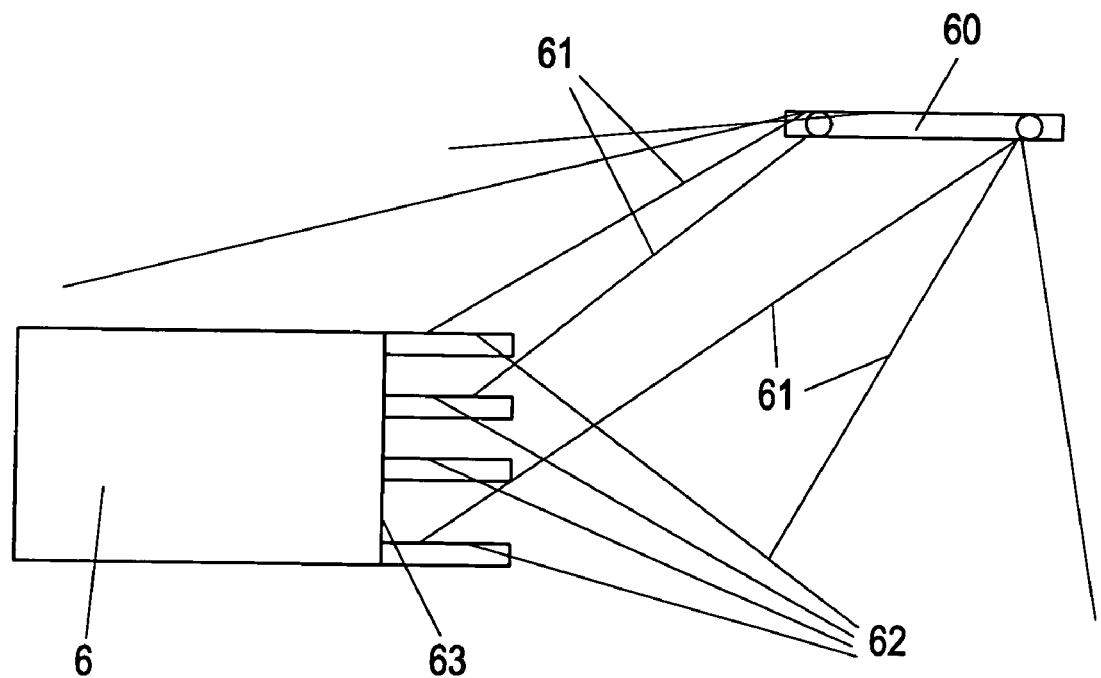
Figure 10:
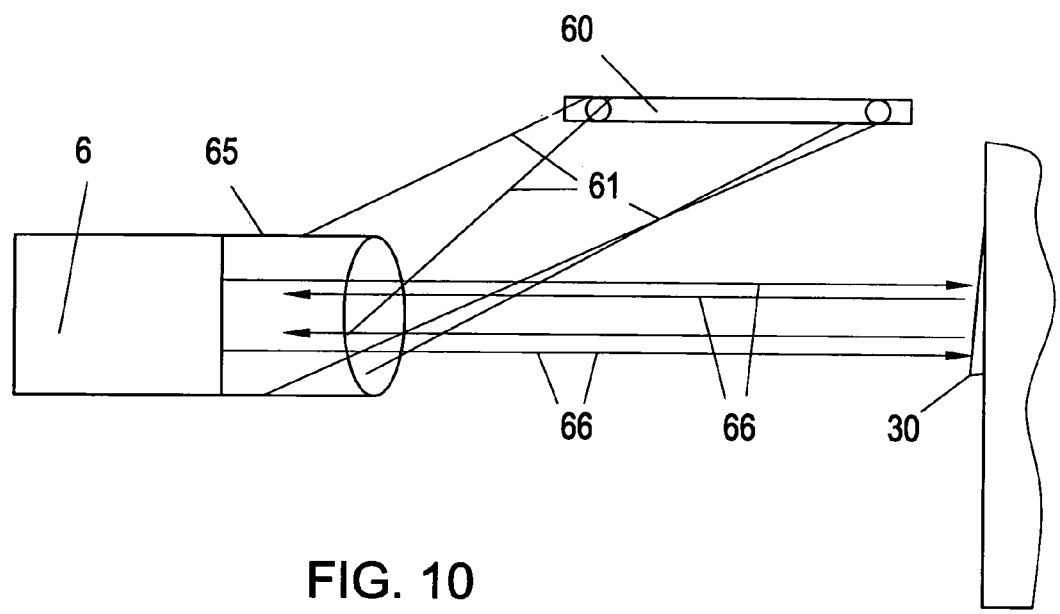
Figure 11:
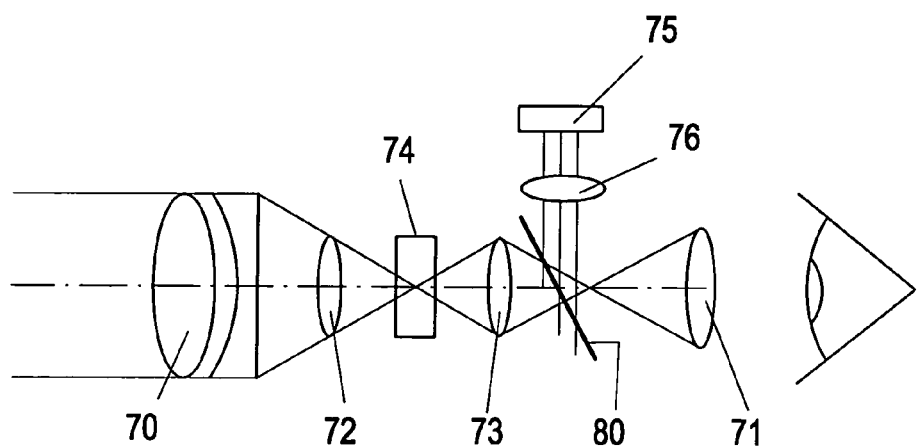
Figure 12:
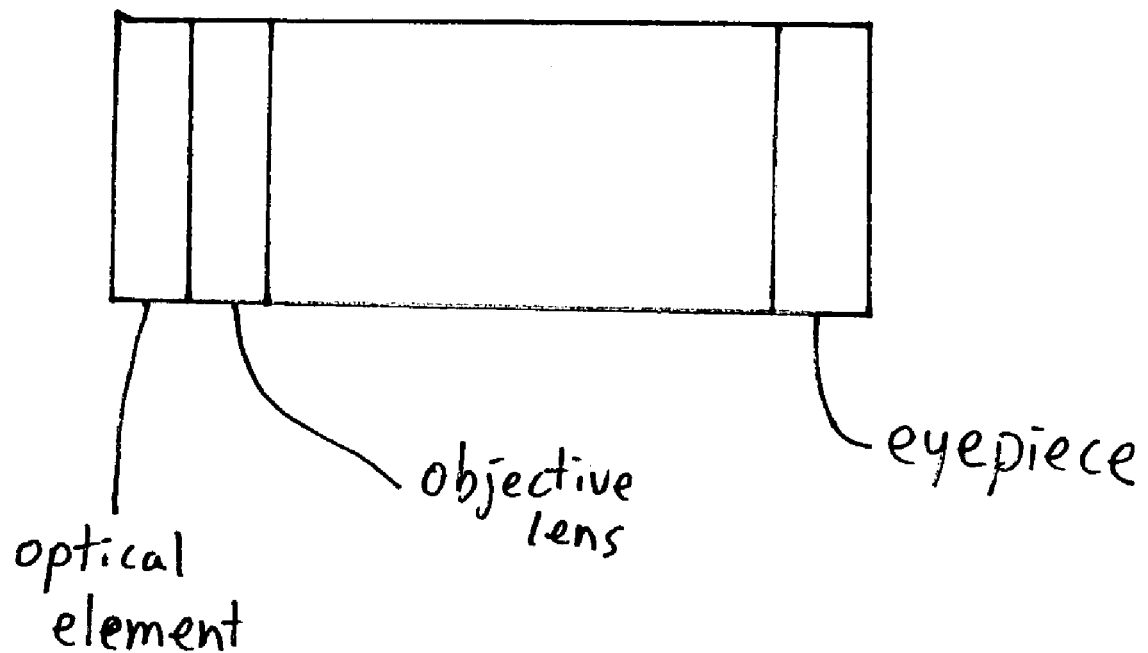
Figure 13:
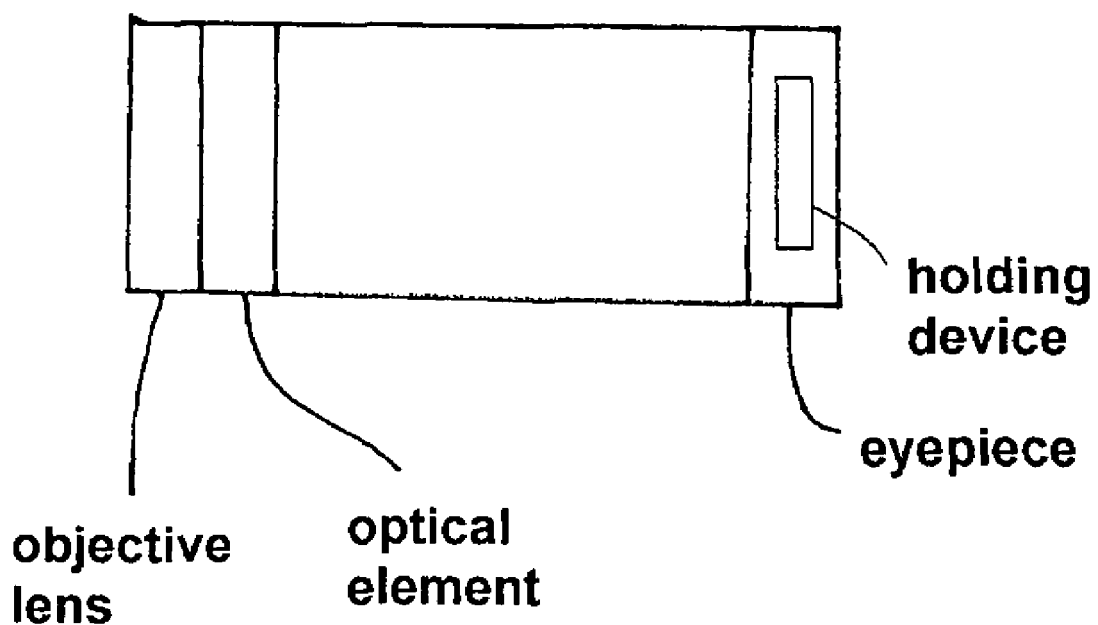
Figure 14:
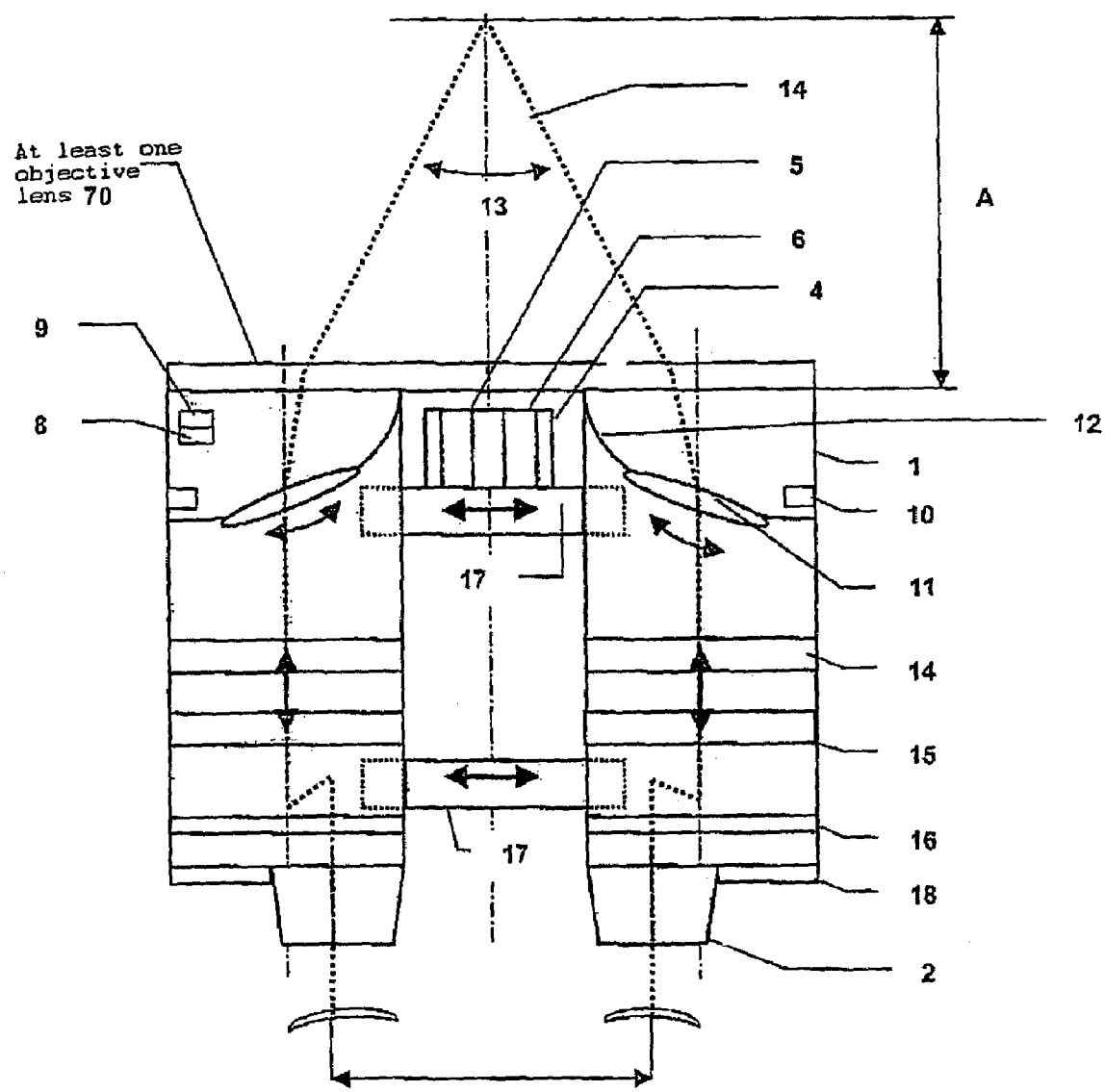

FIGS. 7, 7a and 7b show one embodiment with a device in front of the sensor for the autofocussing means, FIG. 8 shows an embodiment in which the two lens system are housed in a common tube, FIG. 9 shows in a schematic representation one embodiment of the vision aid with a means for preventing the entry of outside (infrared) light into the receiving part of the infrared autofocussing means, FIG. 10 shows in a representation similar to that of FIG. 9 another embodiment of the means for preventing the entry of outside (infrared light) into the receiving part of the infrared autofocussing means, FIG. 11 schematically shows a block diagram of the arrangement of a transparent display in the beam path of the vision aid, FIG. 12 shows a vision aid having an optical element located in front of a plane of an objective lens, FIG. 13 shows a vision aid having an optical element located between the objective lens and the eyepiece, and FIG. 14 shows a vision aid having two lens systems which comprise at least one objective lens and one eyepiece.

DETAILED DESCRIPTION OF THE PREFERRED EMBODIMENTS

Figure 1:
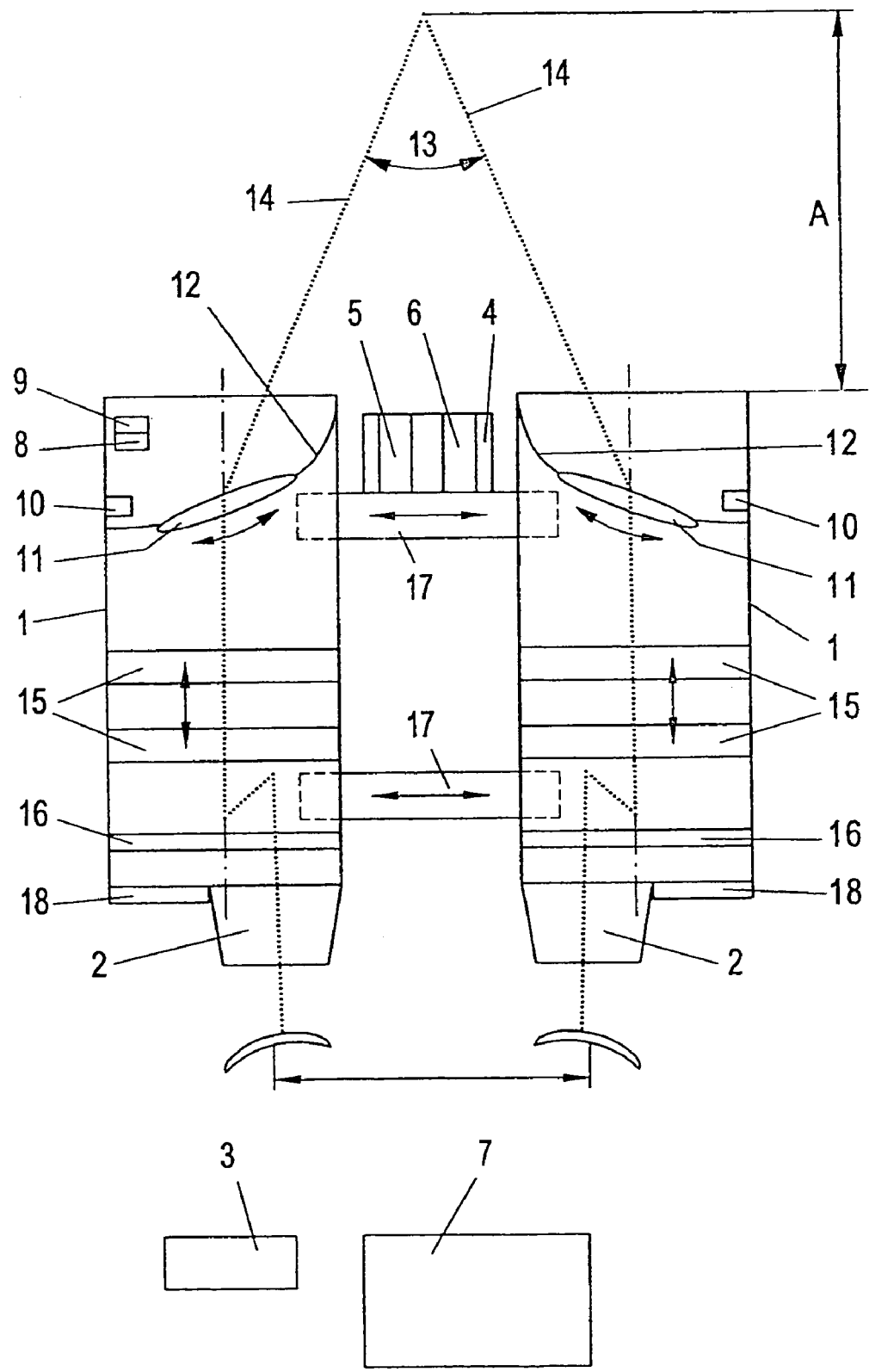
FIG. 1 shows a vision aid.

FIG. 1 shows a vision aid ("telescopic spectacles") consisting of two tubes 1, eyepiece parts 2, an autofocussing means 4 which is mounted in the middle in this embodiment with an infrared diode 5 and a receiving unit 6. The tubes 1 can be connected to one another fixed, or as shown in FIG. 1, by segments 17 of adjustable length. An external switch 3 and an external electronic unit 7 can be connected to the vision aid by cable, or, as in this embodiment, without a cable, for example by radio transmitters 8 and radio receivers 9 or otherwise.

Figure 1A:
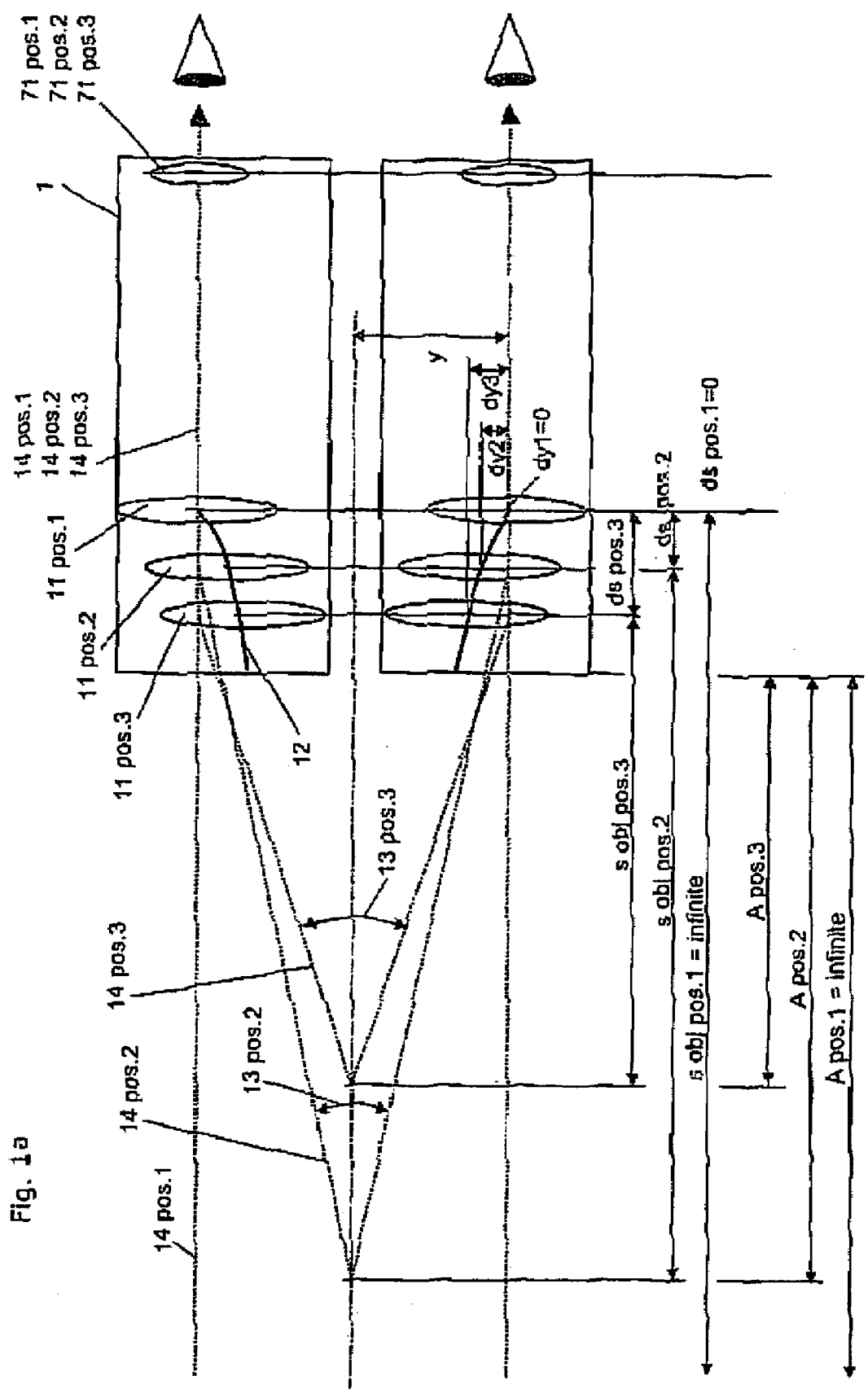
FIG. 1a shows movement of the optical elements of the vision aid.

FIG. 1 furthermore shows two bent boards in this example which are housed in the tubes 1 as guides 12 on which optical elements 11 can be moved back and forth by servomotors 10 such that the refractive property of their respective position yields the angle 13 necessary for each selected working distance A between the beam paths 14 emerging from the tubes 1. As seen in FIG. 1 and FIG. 1a, the guides 12 are curved such that as the working distance (or longitudinal distance) decreases, there is a decrease in the lateral distance (the distance between right and left optical elements 11). The optical elements 11 with the corresponding shape can also be housed in the tubes or placed in front of them. The optical elements 11 can also be movable on straight or bent boards. The optical elements 11 can also be only rotated or tilted. The measurement basis for the positioning of the optical elements 11 is delivered by the autofocussing means 4. The computation of the position of the optical elements 11 which is necessary for parallax compensation is prepared by the electronic unit 7. The electronic unit 7 also determines the position of the lens system of the focussing unit 14 which is optimum for each working distance A. This position is likewise brought about by the servomotors 10.

Furthermore, FIG. 1 shows a lens system 15, using which after activation by the external switch 3 or via voice control the magnification factor ("zoom") of the vision aid can be continuously changed.

All other functions of the vision aid can be activated, deactivated or changed by means of the external switch 3 or via voice control.

If necessary, additional information, such as the vital signs of a patients, computerized tomography or x-ray data or pictures, measurement scales or the like can be inserted into the optical plane 16 which is located within the two tubes 1. Such inserted information can be selected by changing the viewing angle of the vision aid to the viewed object. Alternatively or additionally, displays 18 can also be mounted next to an eyepiece 2 or next to the two eyepieces 2 and can display this additional information. Insertion of information can also take place stereoscopically, i.e. with individual pictures corrected with respect to parallax and/or eye distance and can be fixed as an entire or partial picture ("freeze-frame").

The additional information converted into video form can be displayed faithfully in position relative to the viewed object. This can take place by using optical, electromagnetic or other positioning systems together with inertial sensors. This system can also be used to determine the position of objects, for example, surgical instruments relative to a patient, and to display it via an optical plane in the beam path of the vision aid or via externally mounted displays.

These inertial sensors, linear or angle encoders or also ultrasonic, infrared or other system can also be used to acquire the current parameters of the vision aid, for example the magnification range, distance to a viewed object, etc, and can be used for modification of additional computer-generated or optical information and/or displayed.

The vision aid as claimed in the invention can furthermore be equipped with a device for illumination of the working area. In doing so the light necessary for this purposes can be guided forward into the vicinity of the plane of the objective lens of the vision aid by means of fiber optics from an external light source via the headset. A lens system can be attached to the end of the optical fiber and it concentrates the emerging light according to the chosen working distance and magnification factor such that the working field is optimally illuminated in terms of size and intensity. The measurement data necessary for this purpose can be received from internal or external sensors. Alternatively or additionally, light can also be coupled by means of fiber optics into the optical system of one tube 1 or the two tubes 1 such that it is routed to the object within the optical system coaxially to the optical beam path 14. In this way a parallax angle between the optical beam path 14 and the illumination of the working area is prevented.

The above described matching of the light intensity and size of the illuminated surface for matching to the magnification chosen at the time and to the respective working distance can take place within the optical system of the vision aid.

Figure 2:
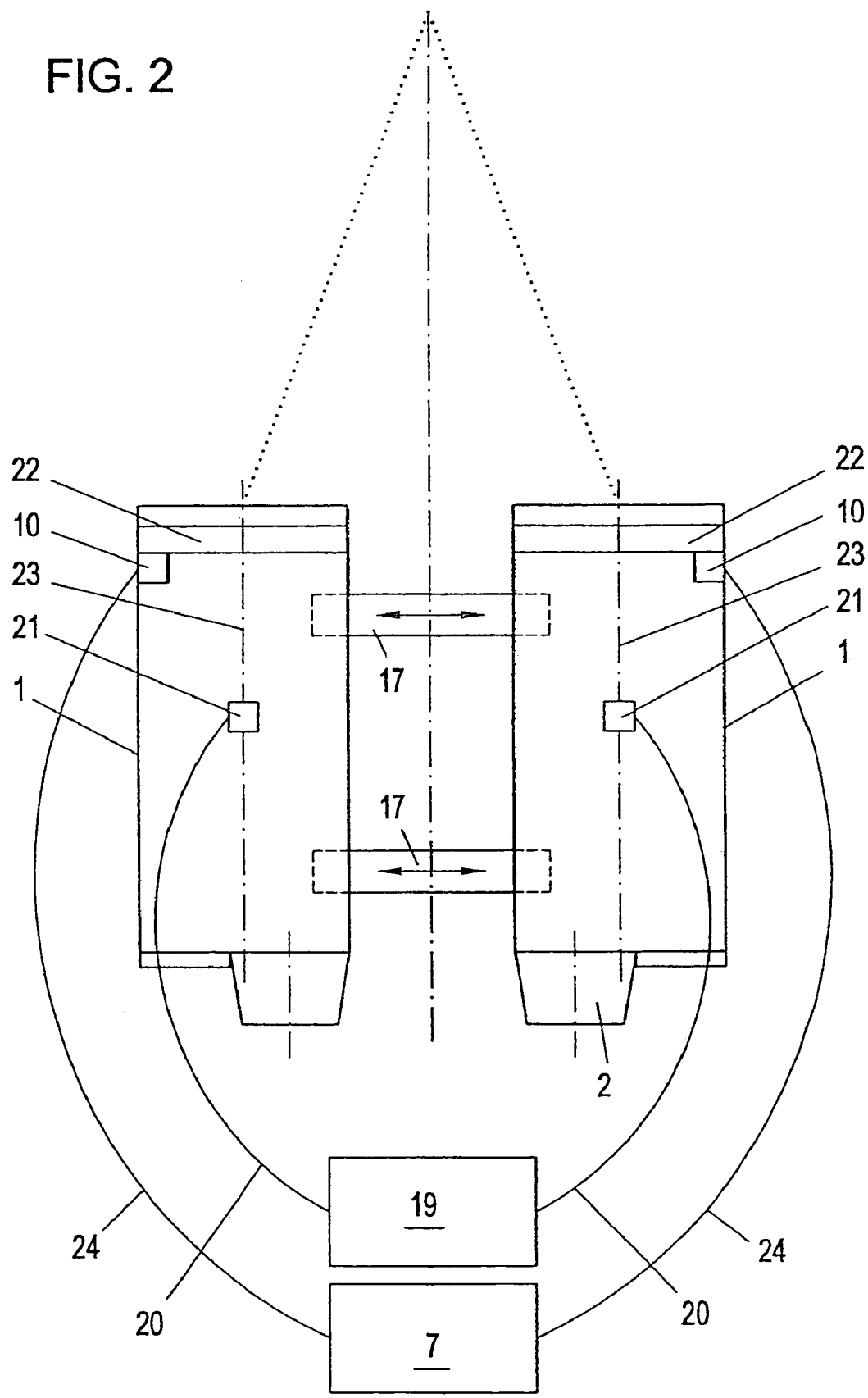
FIG. 2 shows a vision aid with an illumination means.

FIG. 2 schematically shows coupling of light for coaxial illumination of the object field. In doing so light is guided into the optical elements 21 from an external light source 19 via optical fibers 20. These elements 21 cause coaxial alignment of the light beam 23. Illumination which is optimum for each working distance in intensity and size is ensured by a lens system 22 via servomotors 10 which are connected without cables or, as in this application, by means of cables 24, to the external electronics 7 for purposes of transmission of positioning data.

Figure 3:
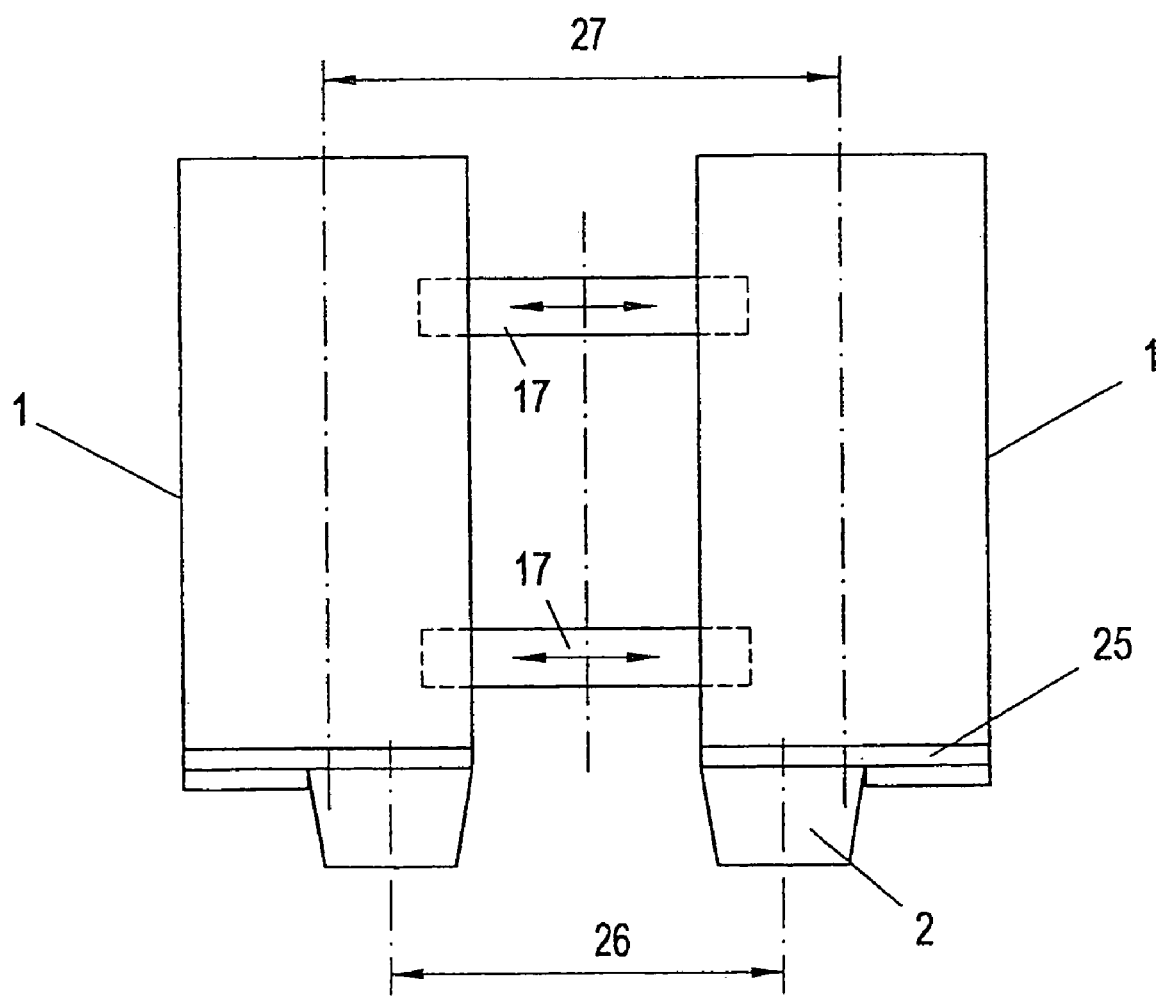
FIG. 3 shows an embodiment in which the distance of the objective lens can be changed.

Often, for example in microsurgery, matching the 3-D effect to the respective application or to the surface structure of the object area viewed at the time is desirable. The vision aid as claimed in the invention solves this problem with a device with which the distance between the objective lenses of the vision aid can be changed when the distance between the eyepieces 2 remains the same. FIG. 3 schematically shows one embodiment of the vision aid as claimed in the invention with a device 25 for adjusting the distance of the tubes 1 which are connected to one another by segments 17 of variable length when the distance 26 of the eyepieces remains the same and thus also for adjusting the 3-D effect which arises for the user. This device 25 in this embodiment is made as a component on which the eyepieces 2 can be pushed diametrically opposed in order to keep the distance 26 between them constant as the distance 27 of the tubes 1, therefore the objective lenses, from one another, changes, without in doing so losing the imaging of the object area. This effect can however also be achieved by movable optical components in front of the objective lenses or within the tubes 1.

To vary the magnification range of the vision aid, in addition to an the optical system in the tubes 1 or alternatively thereto interchangeable eyepieces and/or interchangeable objective lenses can be used.

In medical diagnostics, a process is used which is called photodynamic diagnosis. Here a photosensitive substance is used which accumulates in certain, for example malignant tissue parts and afterwards by irradiation with light of a certain wavelength—for reasons of its penetration depth of roughly 5 mm normally red laser light is used—is made visible. Another possibility is to use the different autofluorescence properties of healthy and malignant tissue parts under light with a certain wavelength in order to make visible certain carcinomas or precarcinogenic tissue parts. Currently a number of systems are known for performing these tasks, generally using an endoscope or an surgical microscope. Although the use of this technology would be very advantageous, for example during open surgeries, for a long time there have been no vision aids worn on the head which would allow their use in this diagnosis. The vision aid as claimed in the invention can be made in an embodiment such that filters can be placed in the beam path of the optical system and they enable or facilitate the perception of certain reflection properties of the viewed object area which have arisen due to irradiation with light of a certain wavelength. For cases in which the reflection differences of the viewed object field, for example autofluorescence of the tissue sites, cannot be recognized purely visually, one embodiment of the vision aid can be equipped with an internal and/or external receptor, for example a camera chip which records the light which has been guided from the light source directly or via an external or internal coaxial fiber optic system to the viewed object and which is reflected thereby, analyzes it via internal or external software applications, and thus assigns different colors to healthy and suspicious tissue parts. These colors can then again be reflected into one tube 1 or into the two tubes 1 of the optical system and can be viewed by the user there. The colors can also be reproduced via external displays or monitors, optionally with a hairline reflected in, which hairline shows the position and size of the light beam on the object. This can lead to improvements in the radicalness of removal or early detection of carcinomas for example in open surgical tumor removal.

Figure 4:
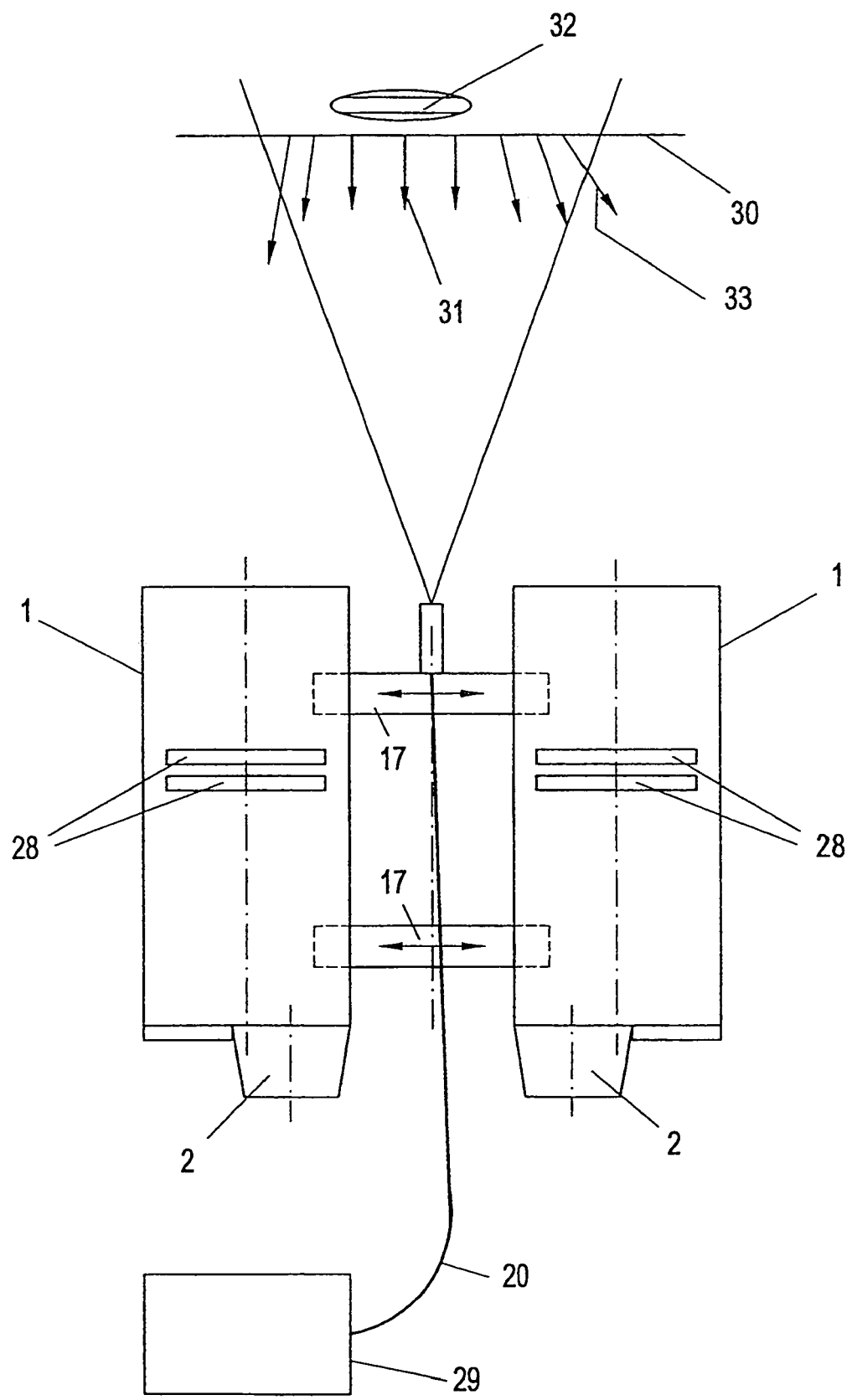
FIG. 4 shows a vision aid with the laser light source assigned to it.

FIG. 4 schematically shows a vision aid consisting of the tubes 1, the eyepieces 2, the connecting segments 17 which have an adjustable length, in the optical systems of which there are two filters 28 each. The filters 28 can be pushed manually or by motor, for example by lateral displacement on a board, into and away from their active position.

Furthermore, in FIG. 4 a laser light source 29 with an optical fiber 20 which in the concrete embodiment illuminates the object field 30 from one position between the two tubes 1 of the vision aid and penetrates to under the surface of the object field 30. The light 31 which has been reflected by a (surface) carcinoma 32 has different properties than light 33 which has been reflected by healthy tissue. These differences are made visible either by reflecting out the image, analyzing the image, color coding the image and reflecting the image back in, or as shown in FIG. 4, by the filter 28 which has been pushed into its active position 28. In the known vision aids which are worn on the head the problem of the tilting moment produced by the weight of the vision aid and its necessary distance from the eyes of the user had remained unsolved for a long time. The vision aid as claimed in the invention in one embodiment (FIGS. 5 and 6) solves this problem by attaching a bent tension brace 35 which runs over the lengthwise axis from the rear part to the front part of the headset 34 and/or a weight 36 which is attached to the rear part of the headset 34. In this way the center of gravity is shifted away from the sensitive forehead and nose area of the user towards the unproblematical center of the head and thus also to the ergonomically desirable lengthwise axis of the body is achieved.

Figure 5:
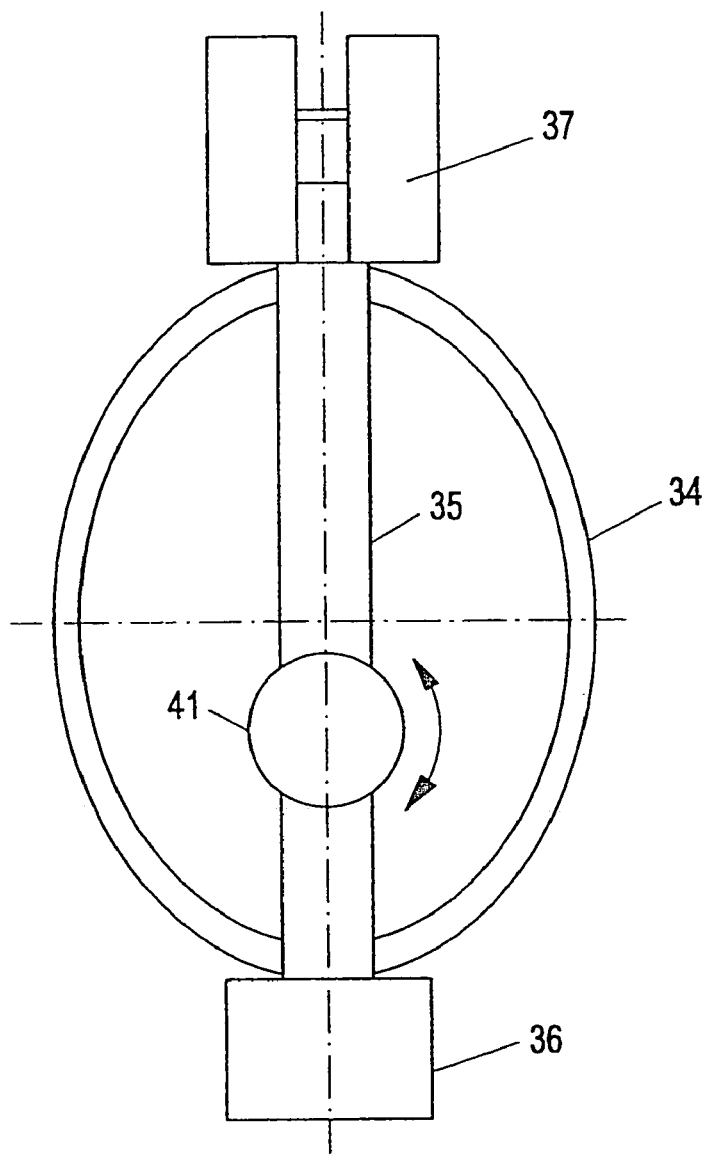
FIGS. 5 and 6 show a headset for the vision aid.

FIG. 5 shows a headset 34 with a tension brace 35 and a counterweight 36.

Figure 6:
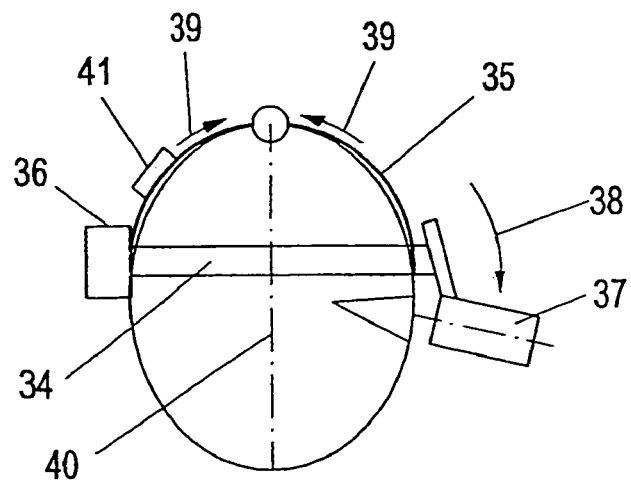

FIG. 6 shows a schematic vertical section of the headset 34. Here it can be seen how the tilting moment 38 which is triggered by the weight of the vision aid 37 and the distance from the eyes of the user is balanced by the counterweight 36 with the tension brace 35 which is adjustable in its length by an adjustment means 41. The weight can thus be shifted along the lines 39 of force to the lengthwise axis 40 of the user on the middle of his head.

Especially at high magnifications in vision aids worn on the head did the problem of "quivering" and "blurring" occur in the past. The vision aid as claimed in the invention solves this problem in one preferred embodiment by active and/or passive vibration damping.

It can happen that a user of the vision aid when viewing an object might not want to sharply see the area acquired by the middle-accentuated autofocus, but a different area which is located for example on the edge of the picture. The vision aid as claimed in the invention can therefore be equipped with a device for detection of the location of the pupil of the user, coupled to multiple autofocus areas and a pertinent control unit.

There are circumstances under which it would be desirable for the user of a vision aid worn on the head to be able to control the functions of the vision aid and/or external devices without needing to touch a switch. Voice control which can be used for this purpose cannot be used under all conditions. For this reason, in the relevant areas of the headset of the vision aid as claimed in the invention electrodes can be attached which pick up the brain currents of the user and use them to control the described functions of the vision aid and/or for reconstruction of the pictures perceived by the user.

Furthermore, in relevant areas of the headset biofeedback sensors can be attached which can establish the location of the user. The information obtained therefrom can then be used in the most varied ways, for example to warn a surgeon in case of excess stress or exhaustion and fatigue.

In the embodiment shown in FIG. 7, FIG. 7a, and FIG. 7b, in the autofocussing means 4 which is made as an infrared (IR) system, on the receiving unit 6 thereof there is a device which prevents the infrared radiation 43, 44 which is not reflected from the object field 30, which does not originate from the autofocussing means 4, or which belongs to it from entering the autofocus receiving unit 6. These reflected infrared rays 48 which do not belong to the autofocussing means 4 can originate from passive infrared image following or navigation systems 42.

The device formed for example as a filter, especially a polarization filter 45 (FIG. 7), as a tube 47 which is pointed towards the object field (FIG. 7b) or as a louver or grating attachment 46 which is pointed straight or obliquely (FIG. 7a) therefore prevents unwanted influences on the autofocussing system 4.

In the embodiment of the vision aid as claimed in the invention shown in FIG. 8 the two lens systems 51, 52, therefore the right and the left lens system, are housed in a common tube 50 (monotube). The lens systems 51, 52 which are housed in the common tube 50 are protected for example by covers 53 on one or on both ends of the tube 50 from the penetration of impurities and against the incidence of outside and scattered light. Thus, working with the vision aid as claimed in the invention which has not been adversely affected by the incidence of outside or scattered light is possible.

A common tube 50 as is shown for example in the embodiment of FIG. 8 offers the advantage that the vision aid does not need moving parts which lie to the outside. This has among others the advantage of better stability, insensitivity of the vision aid to impact, tension, and twisting. In addition, the vision aid can be made sealed in the embodiment from FIG. 8 against penetration of moisture so that there is protection against penetrating water splashes and it becomes possible to place the vision aid as claimed in the invention in a disinfection solution. Finally, there is no danger that parts can fall from the vision aid as claimed in the invention onto the surgical field.

As in the other embodiments of the vision aid as claimed in the invention the parallax angle is compensated when the focal length is changed by optical elements 11 within the common tube 50, as has been described in conjunction with the other embodiments (especially FIG. 1).

In particular, in surgeries, for example surgeries on the human brain, in which the surgeon cannot directly view the surgical field, but only via contrivances, infrared-controlled devices are used to track the location of the instruments relative to the patients and to display it on a monitor. These devices (infrared tracking means) have proven themselves extraordinarily well. When a vision aid as claimed in the invention is used at the same time with one such infrared tracking means, there is the danger that infrared light emitted from the infrared tracking means will adversely affect the autofocussing means of the vision aid which is likewise infrared-controlled. To take remedial action, in the vision aid as claimed in the invention parts can be assigned to the autofocussing means to prevent the incidence of outside light or scattered light, especially light from infrared tracking means 60. This was explained in principle further above using FIGS. 7, 7a and 7b. Also when using the vision aid as claimed in the invention in the area of industry the infrared portion of daylight can also be disruptive. In order to prevent disruptive infrared light from adversely affecting the autofocussing means 4 of the vision aid as claimed in the invention, in one embodiment of the invention according to the vision aid measures are taken which prevent the incidence of disruptive infrared light which can originate from infrared tracking means 60 and/or by daylight.

One embodiment of one such means is shown in FIG. 9. It consists of several louvers which are aligned parallel to one another and which project over the entry opening 63 of the infrared receiver of the autofocussing means 4 so that the infrared receiver 6 of the autofocussing means 4 of the vision aid as claimed in the invention cannot receive infrared light 61 which is obliquely incident, since this is prevented by the louvers 62 which are located in front of the receiver 6 at the inlet to the receiver 6. Infrared rays which are aligned exclusively parallel to the viewing direction of the infrared receiver 6 can strike the receiver 6.

To prevent, for example when using infrared trackers, the scattered infrared light which is used in surgical navigation systems and which is intended for position determination of surgical instruments from entering the receiving unit 6 of the autofocussing means 4 of the vision aid as claimed in the invention and thus to avoid disruptions of the focussing process caused by scattered infrared light, the embodiment shown in FIG. 10 can be used. In this embodiment, in front of the receiver 6 of the autofocussing means there is a tubular screen 65 similar to a sunshade which is used in front of the objective lenses of a camera. FIG. 10 shows that infrared light 61 which originates from the infrared tracking means 60 cannot reach the receiver 6 of the autofocussing means 4. Only infrared light 66 which has been emitted by the infrared means 5 which belongs to the autofocussing means 4 of the vision aid as claimed in the invention and which was reflected by the object plane 30 (object field) can reach the receiver 6. Infrared light 61 which proceeds from the infrared tracker 60, which is conventionally attached overhead, cannot enter the entry opening 63 of the infrared receiving unit 6 of the autofocussing means of the vision aid as claimed in the invention. The tube 65 which is pointed towards the object field in front of the receiving part 6 of the autofocussing means 4 can be coated for intensifying the effect on the inside with light-absorbing material or can be made of this material.

Alternatively to the embodiments shown in FIGS. 9 and 10 it is also possible to prevent outside light incidence (incidence of infrared radiation) by various (polarization) filters.

To reflect data and other information into the vision field of the vision aid as claimed in the invention, various possibilities have been opened up. Disadvantages of known possibilities for reflecting data and other information into the vision field of the vision aid as claimed in the invention, have the defect that the reflected-in data or other information (computer tomography and magnetic resonance images) cannot be displayed brightly enough and with sufficient contrast to enable the user of the vision aid as claimed in the invention to work without fatigue.

FIG. 11 schematically shows one embodiment of a vision aid as claimed in the invention with which data and other information can be easily reflected into the vision field of the vision aid as claimed in the invention. In the embodiment shown in FIG. 11, in the beam path between the objective lens 70 and the eyepiece 71 of the vision aid as claimed in the invention, preferably between the telecompressor 72 and the teleconverter 73, there is a transparent display 74. This transparent display 74 shows an inverted image of the main display 75 to the extent there is no beam splitter 80 between the teleconverter and the eyepiece. In this connection the beam splitter 80 is defined as an optical means which partially reflects light beams, therefore deflects them for example by 90°, and in part is transparent to light beams. This beam splitter 80 can be a Porro prism or a partially transparent mirror. This results in that at the site at which the data and other information are inserted into the vision field of the vision aid as claimed in the invention the image produced by the vision aid is masked out. In this way the graphics (inserted data and other information) becomes brighter and has higher contrast because they do not conceal the image. In the embodiment shown in FIG. 11 the main display 75 accepts information from external sources, for example, magnetic resonance displays or computer tomographic devices, digital x-ray machines, etc. and reflects it into the beam path of the vision aid as claimed in the invention via projection optics and the beam splitter 80.

It is therefore important in the embodiment shown in FIG. 11 that the object image is darkened or attenuated wherever the information of the main display 75 is displayed, so that the data and other information are better visible on the main display 75.

In summary, one preferred embodiment of the invention can be described as follows:

FIG. 14 shows a vision aid in the form of telescopic spectacles has two lens systems which comprise at least one objective lens 70 and one eyepiece 71 each. An autofocussing means is assigned to the lens systems and changes the focal length of the lens systems for sharp focussing of the latter according to the distance of the telescopic spectacles from the object. Furthermore, a means for changing the magnification factor by changing the focal length of the lens systems ("zoom") and finally a means for matching the parallax between the lens systems of the vision aid to the focal length which is set each time according to the distance of the telescopic spectacles from the object are assigned to the lens systems. The parallax is matched using adjustable optical elements 11 which are provided in the beam path of the lens systems, with which elements the angle 13 between the beam paths 14 which run from the lens systems 1 to the object can be changed.

In the embodiment of FIG. 12, the optical element(s) are located in front of a plane of the objective lens. However, alternate embodiments are considered as set forth in the appended claims. For example, FIG. 13 shows a vision aid having an optical element located between the objective lens and the eyepiece. FIG. 13 also shows a holding device on eyepiece 2 of the vision aid that may hold an optical vision device such as eyeglasses. The optical vision device may be next to the eyepiece 2.

What is claimed is:

1. Vision aid in the form of telescopic spectacles with two lens systems, which each comprise:
    at least one objective lens and one eyepiece having an internal beam path therebetween,
    an autofocussing means which changes the focal length in order to adjust the lens systems according to a distance of the telescopic spectacles from an object,
    a means for changing a magnification factor of the lens systems, and
    at least one optical element that is distinct from said at least one objective lens and said eyepiece and that is positioned and arranged to match parallaxes between the lens systems of the vision aid to the focal length which has been set according to the distance of the telescopic spectacles from the object, such that in each said lens system, said at least one optical element is movable along a curved guide so as to follow a curved path that crosses said internal beam path for changing an angle between external beam paths which run out of the respective lens systems towards the object, said curved guide being arranged so that as the distance of the telescopic spectacles from an object decreases there is a decrease in distance between respective optical elements of the lens systems.

2. Vision aid as claimed in claim 1, wherein the optical elements are lenses or groups of lenses.

3. Vision aid as claimed in claim 1, wherein the optical elements are prisms or groups of prisms.

4. Vision aid as claimed in claim 1, wherein each of the lens systems is located in a respective tube.

5. Vision aid as claimed in claim 1, wherein the lens systems are located in a common tube.

6. Vision aid as claimed in claim 5, wherein the lens systems are covered by a cover which is located adjacent to the objective lens and/or a cover which is located adjacent to the eyepiece.

7. Vision aid as claimed in claim 1, wherein the optical elements are located within a tube or within tubes.

8. Vision aid as claimed in claim 1, wherein the at least one optical element is located in front of the plane of the at least one objective lens.

9. Vision aid as claimed in claim 1, wherein information in video and/or text form is insertable into at least one optical plane which is located in one of the lens systems.

10. Vision aid as claimed in claim 1, wherein there are displays for display of information in video and/or text form next to at least one of the two eyepieces.

11. Vision aid as claimed in claim 10, wherein the images acquired by the vision aid are transmittable by another optical element or by reflecting them out of at least one of the two beam paths of the vision aid onto the display means.

12. Vision aid as claimed in claim 10, wherein anatomical, functional and technical information is insertable as information in always the same position.

13. Vision aid as claimed in claim 10, wherein additional data about interactive determination of the location of medical devices and/or instruments relative to the patient is insertable.

14. Vision aid as claimed in claim 1, wherein a display means is connected to the vision aid and the images acquired by the vision aid are transferable to the display.

15. Vision aid as claimed in claim 14, wherein the display means is located outside the vision aid.

16. Vision aid as claimed in claim 1, wherein video or text insertions which contain information are stereoscopically insertable into the two beam paths of tubes.

17. Vision aid as claimed in claim 1, wherein images or text parts are insertable as individual images which have been corrected by eye distance and parallax.

18. Vision aid as claimed in claim 1, wherein inserted information are selectable by changing the viewing angle of the vision aid to the viewed object.

19. Vision aid as claimed in claim 1, wherein measuring instruments and/or sensors are assigned to the vision aid.

20. Vision aid as claimed in claim 1, wherein images which are inserted into the beam path of at least one lens system or into displays mounted next to the eyepieces are displayable and fixable as entire or partial images.

21. Vision aid as claimed in claim 1, wherein a measurement scale is reflected into an intermediate plane of the objective lens.

22. Vision aid as claimed in claim 21, wherein a measurement scale of the focal length set at the time and the magnification of the objective lens is chosen accordingly.

23. Vision aid as claimed in claim 1, wherein changing the focal length and/or the magnification factor is controllable by a voice-dependent control.

24. Vision aid as claimed in claim 1, wherein on the vision aid there is a light source with an aperture angle which is matchable to the respective magnification of the vision aid such that the size of the illuminated field corresponds to the visual field of the vision aid.

25. Vision aid as claimed in claim 24, wherein the light source is a light source which is supplied via a fiber optic bundle from an external light source.

26. Vision aid as claimed in claim 24, wherein the aperture angle of the light source and the intensity of the emerging light are changeable by one of said two lens systems which is located in tubes or on the light source and/or a shutter.

27. Vision aid as claimed in claim 26, wherein the distance of the objective lenses from one another is provided by a connection with an adjustable length between the tubes which hold the lens systems with a constant connection between the eyepieces of the lens system.

28. Vision aid as claimed in claim 27, wherein the distance of the objective lenses from one another is changeable by parallel adjustment of the tubes and wherein the eyepieces are adjustable diametrically opposite on the tubes.

29. Vision aid as claimed in claim 1, wherein light from a light source is coupleable by a beam splitter or the prism surface of a prism reversal system and emerges through the optical system of the vision aid towards the object.

30. Vision aid as claimed in claim 1, wherein the distance of the objective lenses of the lens systems from one another is changeable at a constant distance of the eyepieces from one another.

31. Vision aid as claimed in claim 1, wherein the eyepieces are made as interchangeable eyepieces and/or the objective lenses are made as interchangeable objective lenses.

32. Vision aid as claimed in claim 1, wherein in the vision aid there is at least one means for acquiring the location of the pupil of the user, which means is coupled to said autofocussing means and wherein the distance (A) between the vision aid and the object is acquired for actuating the autofocussing means at the viewing angle dictated by the location of the pupil.

33. Vision aid as claimed in claim 1, wherein there are filters in at least one of the two lens systems.

34. Vision aid as claimed in claim 33, wherein the filters are adjustable into and out of their working position.

35. Vision aid as claimed in claim 1, wherein in at least one lens system a laser beam emerging from laser means, optionally coupled into the beam path of the lens system, is pointed at the object.

36. Vision aid as claimed in claim 35, wherein the coupling of the laser beam in an intermediate image plane is equipped with a hairline so that the diameter and the position of the laser beam in the object field are displayable.

37. Vision aid as claimed in claim 1, wherein the vision aid is attached to a headset.

38. Vision aid as claimed in claim 37, wherein on the headset there is a tension brace with variable length running from a forehead to a back of a head of a user.

39. Vision aid as claimed in claim 37, wherein on the headset there is at least one, optionally adjustable, counterweight which equalizes the weight of the vision aid in whole or in part.

40. Vision aid as claimed in claim 37, wherein on the headset for the vision aid there are electrodes which acquire brain currents and wherein the electrodes are coupled to a control with which functions of the vision aid are controllable.

41. Vision aid as claimed in claim 40, wherein the control is coupled to external devices.

42. Vision aid as claimed in claim 41, wherein coupling takes place via carrier broadcasting or infrared.

43. Vision aid as claimed in claim 37, wherein on the headset there are biosensors, EEG sensors and/or sensors for measuring skin resistance for acquiring the vital signs of a user of the vision aid.

44. Vision aid as claimed in claim 1, wherein stabilization of the line of sight is assigned to the beam paths through the lens systems.

45. Vision aid as claimed in claim 44, wherein the stabilization of the line of sight is made as active or passive vibration damping.

46. Vision aid as claimed in claim 1, wherein on the eyepieces of the vision aid there are holding devices for optical vision devices.

47. Vision aid as claimed in claim 46, wherein the vision devices which are held by the holding device are located next to the eyepieces.

48. Vision aid as claimed in claim 1, wherein the lens systems of the two beam paths are housed in a common tube.

49. Vision aid as claimed in claim 48, wherein on a receiving unit of the autofocussing means, there is a device that is transparent solely to infrared signals which have been reflected by the object field.

50. Vision aid as claimed in claim 49, wherein the device is a filter.

51. Vision aid as claimed in claim 50, wherein the filter is a polarization filter.

52. Vision aid as claimed in claim 48, wherein the device is a tube which is pointed towards the object field and which is located on the receiving part of the autofocussing means.

53. Vision aid as claimed in claim 48, wherein the device is a louver attachment or a grating attachment which is located on the receiving part of the autofocussing means.

54. Vision aid as claimed in claim 53, wherein the louver attachment or the grating attachment is a louver attachment or a grating attachment pointed in a straight line.

55. Vision aid as claimed in claim 53, wherein the louver attachment or the grating attachment is a louver attachment or a grating attachment which is pointed obliquely.

56. Vision aid as claimed in claim 1, wherein in the beam path of at least one lens system there is a transparent display and wherein virtual displays are reflected into the beam path of the lens system from a main display via a beam guide.

57. Vision aid as claimed in claim 56, wherein the beam guide is a prism or a semitransparent mirror.

58. The vision aid as claimed in claim 1, wherein in each said lens system, the at least one optical element is rotatable along an axis perpendicular to said curved path so that said at least one optical element tilts when said at least one optical element is moved along said curved path.

59. The vision aid as claimed in claim 1, wherein said at least one optical element is structured and arranged to match parallaxes without changing a distance between respective eyepieces.

60. A vision aid having two lens systems, which comprise at least one objective lens and one eyepiece each, with an internal beam path therebetween, said vision aid further comprising:

an autofocussing means which changes a focal length in order to adjust the lens systems according to a distance of the vision aid from an object, a means for changing a magnification factor of the lens systems, and at least one optical element structured and arranged to match parallaxes between the lens systems of the vision aid to the focal length, said at least one optical element being movable along a curved guide so as to follow a curved path that crosses said internal beam path and being structured and arranged to match parallaxes without changing a distance between respective eyepieces, said curved guide being arranged so that as the distance of the vision aid from an object decreases there is a decrease in distance between respective optical elements of the lens systems.

* * * * *